United States Patent
Scheier

[15] 3,653,093
[45] Apr. 4, 1972

[54] POULTRY EVISCERATING MACHINE

[72] Inventor: Donald J. Scheier, Kansas, Mo.

[73] Assignee: Gordon Johnson Company, Kansas City, Mo.

[22] Filed: Nov. 12, 1970

[21] Appl. No.: 88,948

Related U.S. Application Data

[60] Division of Ser. No. 700,907, Jan. 26, 1968, Pat. No. 3,555,593, and a continuation-in-part of Ser. No. 700,907, Jan. 26, 1968, Pat. No. 3,555,593.

[52] U.S. Cl. ............................................................ 17/11
[51] Int. Cl. ..................................................... A22c 21/06
[58] Field of Search ................................................ 17/11, 45

[56] References Cited

UNITED STATES PATENTS

| | | |
|---|---|---|
| 2,774,101 | 12/1956 | Ograbisz ...................................... 17/11 |
| 3,474,492 | 10/1969 | Viscolosi ................................. 17/11 X |
| 1,943,077 | 1/1934 | Jansen ......................................... 17/11 |
| 1,986,195 | 1/1935 | Griffin ......................................... 17/11 |

Primary Examiner—Lucie H. Laudenslager
Attorney—Schmidt, Johnson, Hovey & Williams

[57] ABSTRACT

In the automatic evisceration of poultry the viscera is displaced from the body cavity of the bird through an access opening cut at the vent. In one form of the invention, a spoonlike removal tool applies pressure on the viscera away from the breast and drags the viscera along the backbone. In a second form, a removal tool in the nature of a loop captures the viscera and pulls it from the cavity. The entire operation takes place while the birds are advanced continuously by an overhead conveyor from which they are suspended by their legs. A series of bird-receiving carriages travel around a loop in timed relation to the conveyor, and each carriage is provided with an individual removal tool which enters the cavity on an arc that conforms to the configuration of the breast. At the completion of the operation, a latch is released to remove spring pressure from the tool, causing the latter to swing clear and permitting the eviscerated bird to continue along the conveyor line for successive processing operations.

15 Claims, 22 Drawing Figures

INVENTOR
Donald J. Scheier
BY Schmidt, Johnson, Hovey & Williams
ATTORNEYS

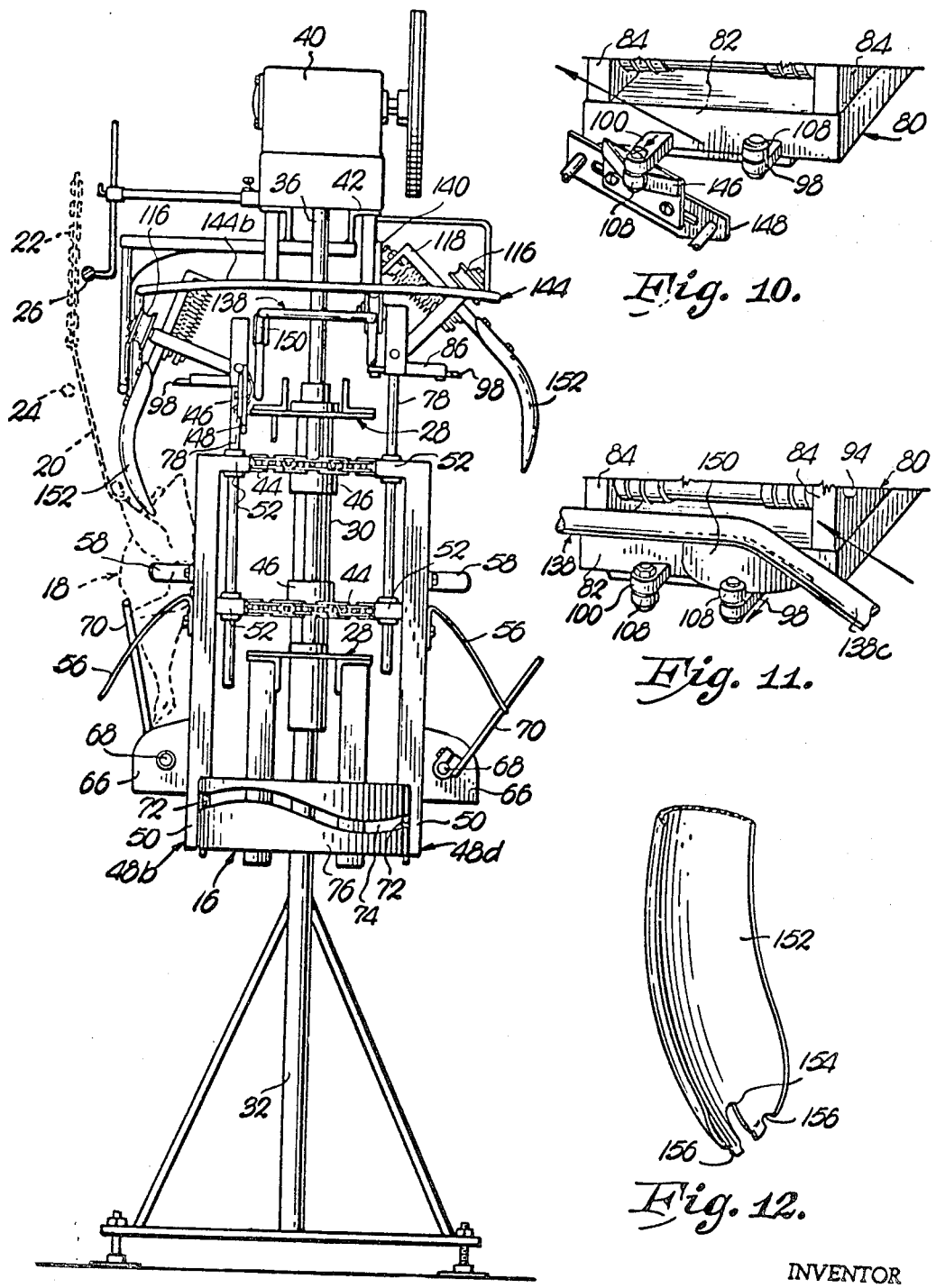

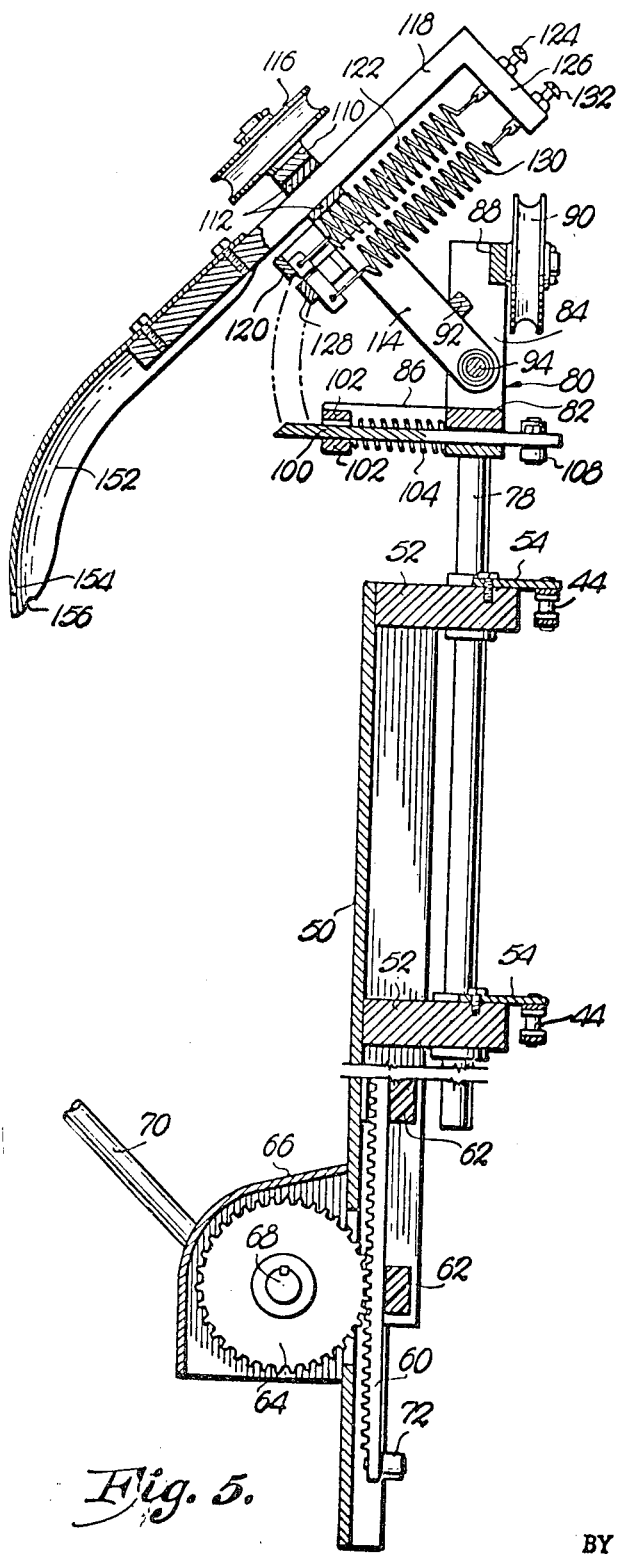

INVENTOR
Donald J. Scheier

BY Schmidt, Johnson, Hovey & Williams
ATTORNEYS

INVENTOR.
Donald J. Scheier
BY
Schmidt, Johnson, Hovey & Williams
ATTORNEYS.

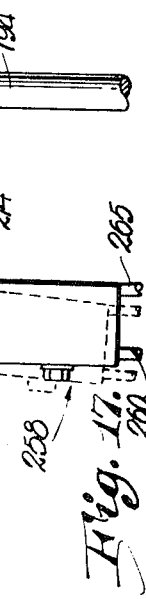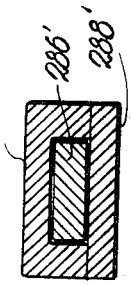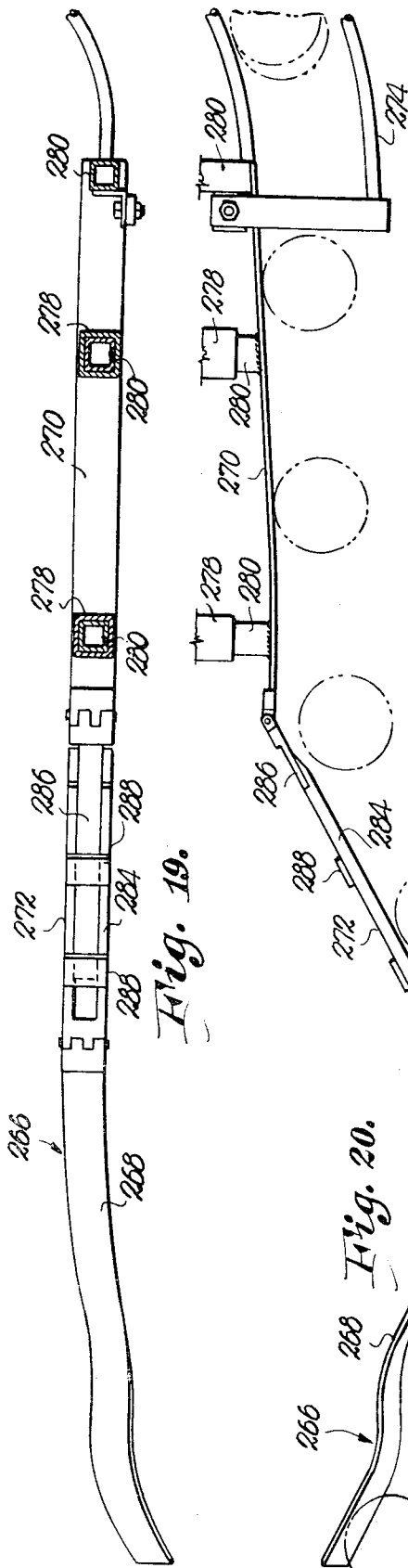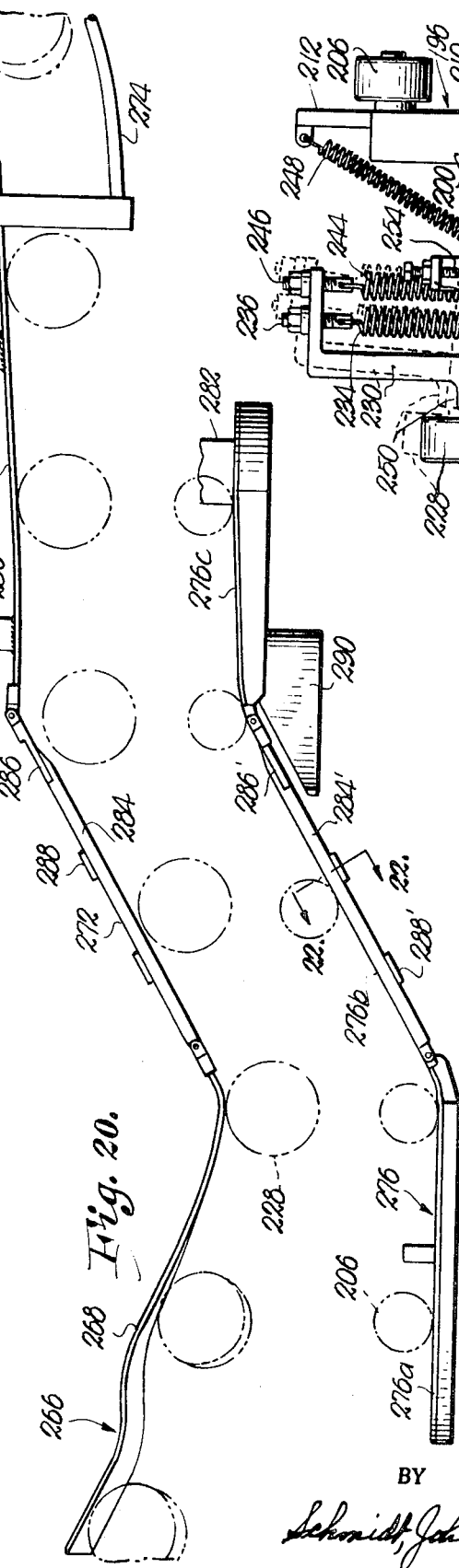

POULTRY EVISCERATING MACHINE

CROSS-REFERENCES

This application is a division and a continuation in part of my copending application, Ser. No. 700,907, filed Jan. 26, 1968, now U.S. Pat. No. 3,555,593, issued Jan. 19, 1971.

It is an important object of my present invention to eviscerate poultry automatically by use of a spring-loaded spoon which enters the body cavity along the breast so as to avoid damage to internal organs and is withdrawn while the viscera is pressed against the backbone of the bird.

Another important object of the instant invention is to provide for withdrawal of the lungs, which are the most difficult to remove of the internal organs, by causing the spoon to first loosen the lungs and then to remove them by a pulling action through veins which connect the lungs with the heart.

Still another important object of the present invention is to perform all of the steps of viscera removal while the birds are continually advanced with the spoon being lowered through the access opening, swung along the breast and raised from within the body cavity without interruption.

Furthermore, another important object of the invention is to eviscerate poultry automatically by use of a removal tool in the form of a loop which enters the body cavity along the breast so as to avoid damage to internal organs, captures the viscera and is withdrawn to pull the captured viscera from the body cavity.

Still another important object of the invention is to provide, in the automatic evisceration of poultry, a method of loosening the esophagus and lungs while leaving the lungs and the sex organs for subsequent inspection and removal.

Yet another important object of the invention is to provide a method and apparatus for automatically eviscerating poultry as a part of a production line process in which individual birds are continuously advanced in succession, wherein a removal tool is inserted into the body cavity of an advancing bird to a predetermined, operative position and then locked in such position prior to withdrawal of the tool and viscera through an access opening cut at the vent of the bird.

In the drawings:

FIG. 3 is an end elevational view thereof;

FIG. 4 is an enlarged, fragmentary elevational view similar to FIG. 1 showing one of the carriages with the spoon and the rollers removed for clearness;

Figure 7:
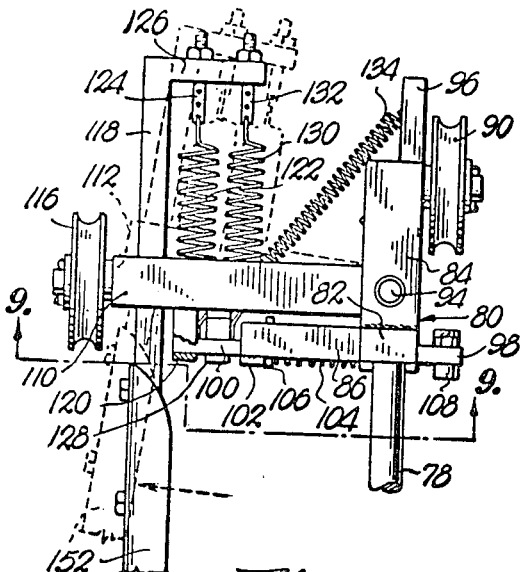
Figure 8:
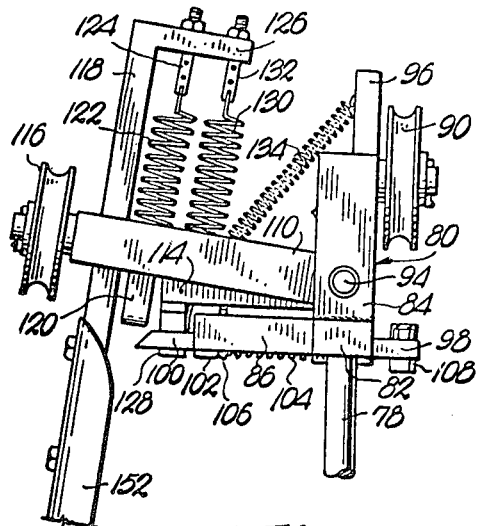
Figure 9:
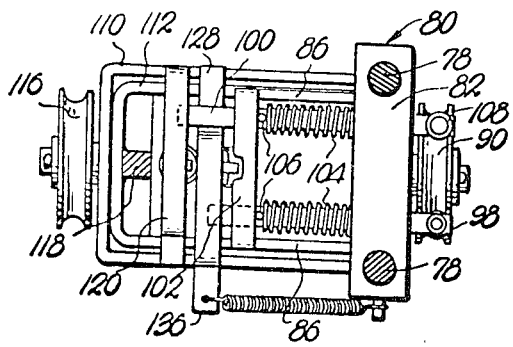
Figure 13:
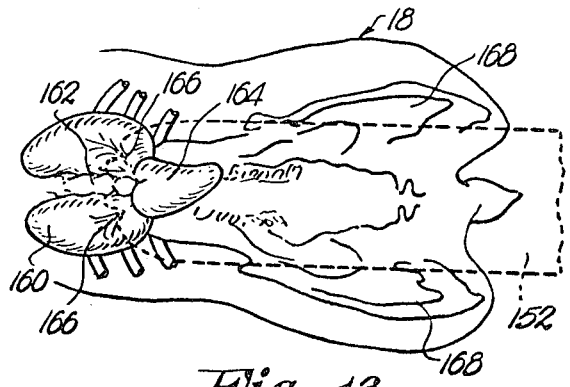
Figure 14:
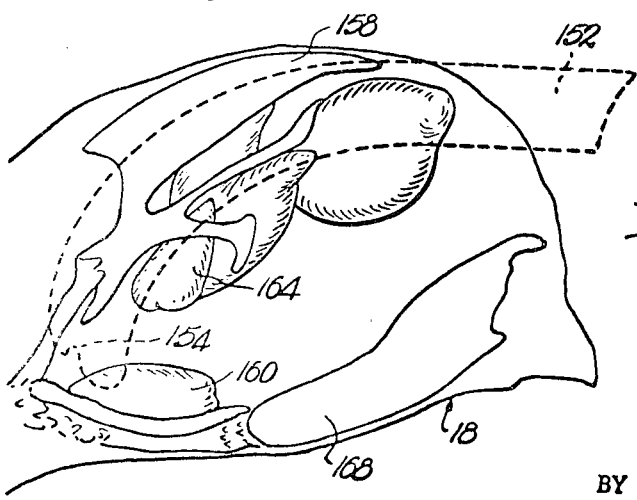
Figure 16:
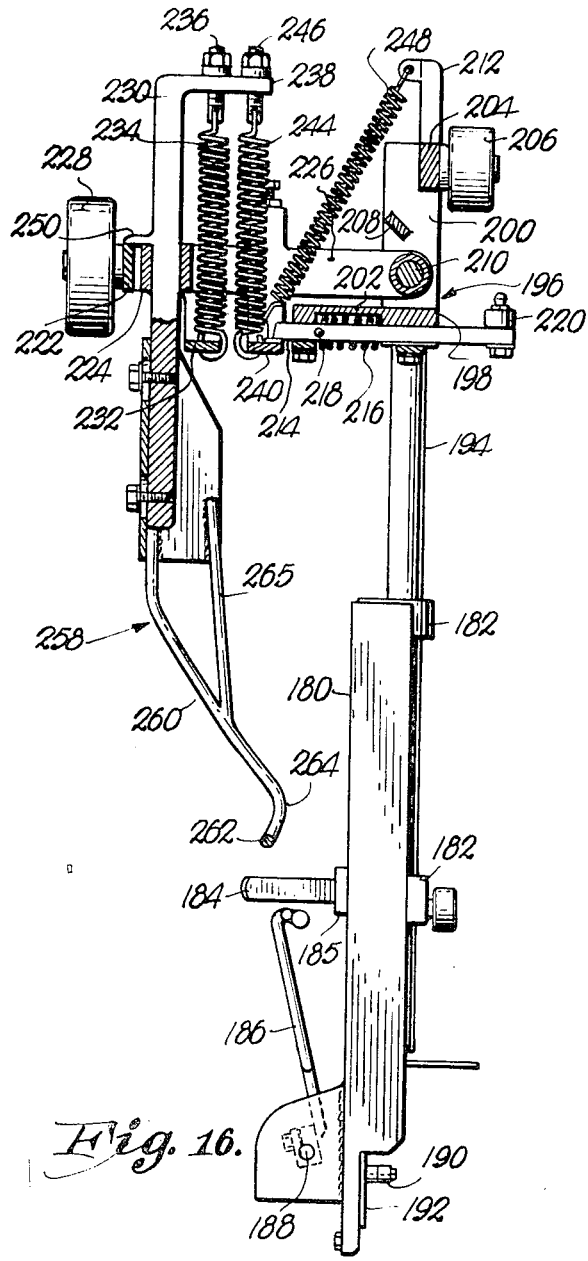
Figure 18:
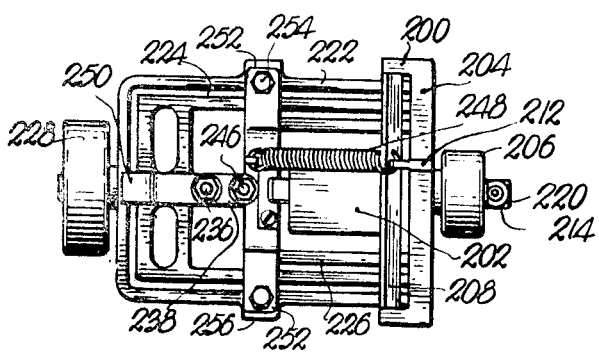
Figure 15:
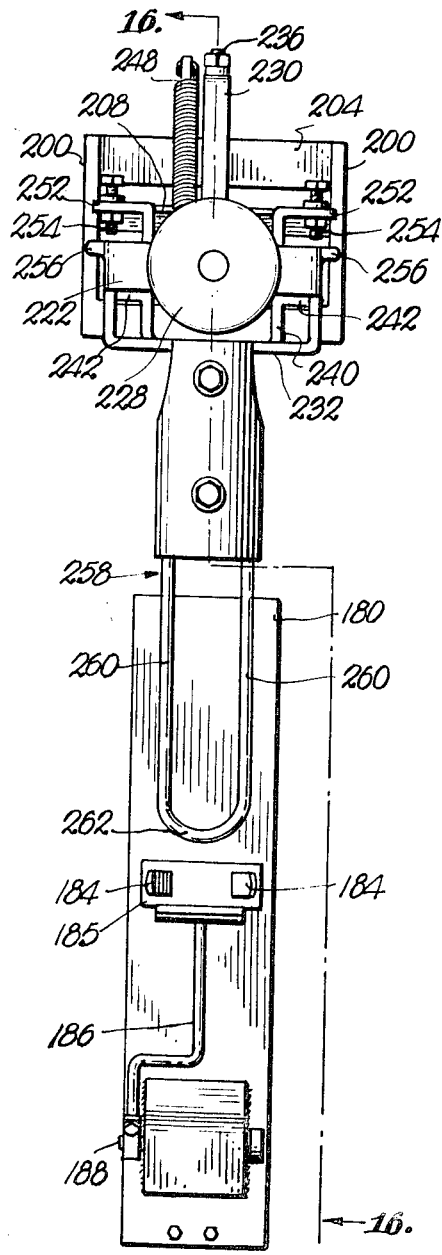

FIGS. 5 and 6 are cross-sectional views taken along lines 5—5 and 6—6 respectively of FIG. 4;

FIG. 7 is an enlarged, fragmentary leading end view of one of the heads of one of the carriages;

FIG. 8 is a view similar to FIG. 7 showing different positions of certain parts;

FIG. 9 is a cross-sectional view taken on line 9—9 of FIG. 7;

FIG. 10 is a detailed perspective view of one of the latch releases;

FIG. 11 is a detailed perspective view of the other latch release;

FIG. 12 is an enlarged, fragmentary perspective view of the spoon;

FIG. 13 is a plan view showing the viscera schematically and illustrating the spoon partially withdrawn from the bird cavity;

FIG. 14 is a perspective view showing the viscera schematically and illustrating the spoon movement into the bird cavity;

FIG. 15 is a side elevational view of a modified form of carriage and head;

FIG. 16 is a vertical sectional view taken along line 16—16 of FIG. 15;

FIG. 17 is a leading end view of the modified head of FIGS. 15 and 16;

FIG. 18 is a plan view of the modified head;

FIG. 19 is a fragmentary, plan view showing a cam and track engageable by the outer roller of the modified head;

FIG. 20 is a side elevational view of the cam and track shown in FIG. 19;

FIG. 21 is a side elevational view of a track which supports the inner roller of the modified head; and FIG. 22 is an enlarged, cross-sectional view taken along line 22—22 of FIG. 21.

DESCRIPTION — FIGS. 1–14

The eviscerating machine 16 is shown by FIG. 3 for use in conjunction with an overhead conveyor for suspending birds 18 from their legs through use of shackles 20 swingable from chains 22, adjustable guide rods 24 and 26 being optionally provided for shackles 20 and chains 22 respectively.

Figure 1:
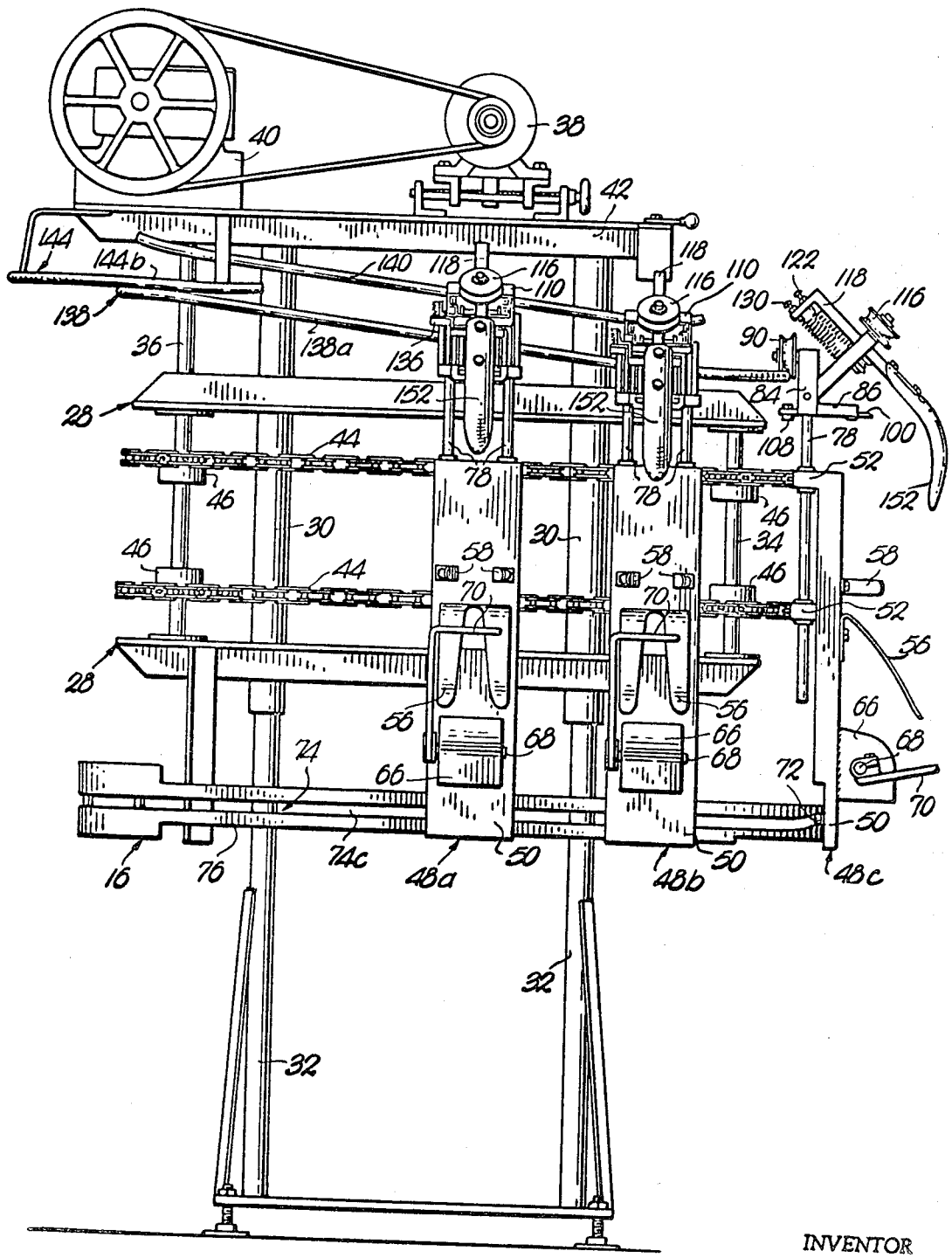
FIG. 1 is a side elevational view of a poultry eviscerating machine made in accordance with my present invention.
Figure 2:
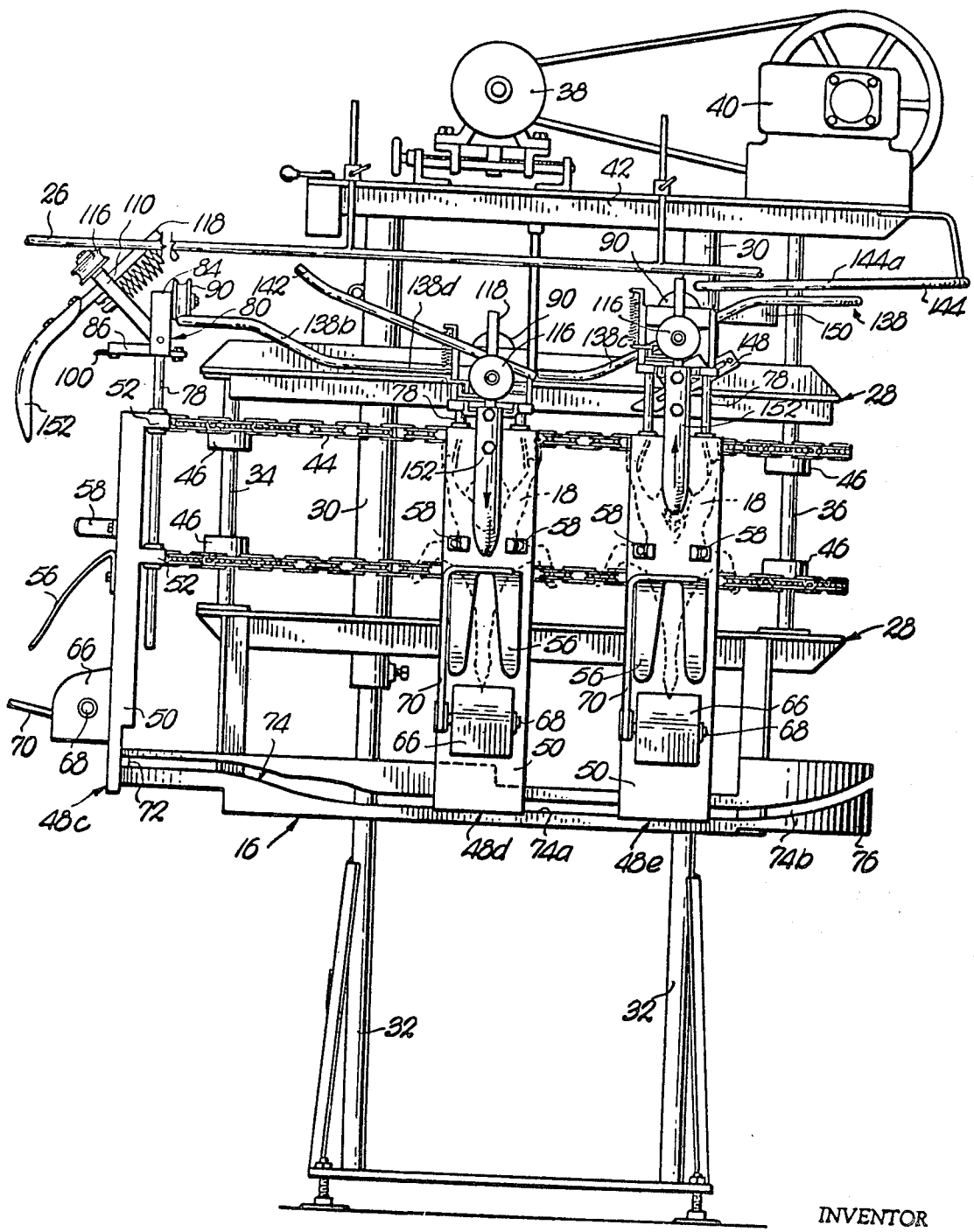
FIG. 2 is an elevational view showing the opposite side thereof.

Machine 16 includes basic framework 28 mounted on a pair of tubes 30 that are vertically adjustable on legs 32. Framework 28 carries a pair of spaced, upright shafts 34 and 36, the latter of which is driven by a motor 38 and gear reducer 40 on platform 42 secured to tubes 30. A pair of endless chains 44 around sprocket wheels 46 on shafts 34 and 36 support a number of carriages, only three of which are shown in FIG. 1 and designated 48a, 48b and 48c. FIG. 2 shows only carriages 48c, 48d and 48e, whereas FIG. 3 shows only carriages 48b and 48d.

The carriages being identical, only one need be described. They each include a U-shaped back-up plate 50 or mount for the bird 18, having a pair of bearing blocks 52 rigid thereto and connected with chains 44 by short links 54 (FIG. 4–6). Each plate 50 has an outwardly and downwardly bowed, vertically adjustable retainer 56, slotted to receive the neck of bird 18, and a pair of laterally adjustable fingers 58, bowed outwardly in opposite directions, and spaced to receive the body of bird 18 above its wings and below its legs.

Each plate 50 also carries a rack 60, reciprocable in bushings 62, and meshing with a pinion 64 in a hood 66, pinion 64 being rigid to a shaft 68 rotatably carried by hood 66. An L-shaped arm 70, rigid to shaft 68, is swingable to and from a position engaging the breast of bird 18 to hold its back against plate 50. A roller 72 on rack 60 travels in a cam slot 74 of an elongated loop 76 secured to framework 28.

A pair of rods 78, reciprocable vertically in blocks 52, carry a head 80 above plate 50, head 80 including a crossbar 82 rigid to rods 78, a pair of upstanding spaced arms 84 rigid to crossbar 82, and a pair of spaced legs 86 rigid to and extending outwardly from crossbar 82. The upper ends of arms 84 are joined by a bar 88 which supports a roller 90. A stop 92 and a shaft 94 also interconnect arms 84, and a finger 96 extends upwardly from one of the arms 84.

A short latch 98 and a long latch 100 reciprocate horizontally in crossbar 82 and between spaced strips 102 joining the ends of legs 86 remote from crossbar 82. Springs 104 around latches 98 and 100 between crossbar 82 and stop pins 106 yieldably maintain pins 106 against strips 102. One end of each latch 98 and 100 is beveled and the opposite end carries a roller 108.

Shaft 94 swingably receives an outer yoke 110, an intermediate yoke 112 and an inner yoke 114, all of which are U-shaped. The bight of yoke 110 has a roller 116 thereon; the bight of yoke 112 has a shank 118 rigid thereto; and the bight of yoke 114 is a tube which receives shaft 94.

An underslung, U-shaped bracket 120, rigid to the legs of the yoke 110, and engageable by the legs of yoke 112 beneath the latter, has its bight engaging latch 100 therebeneath when yoke 110 is locked thereby in its horizontal position. A spring 122 connects at its lower end with the bight of bracket 120 and connects at its upper end with a tension adjusting bolt 124 depending from an extension 126 on shank 118.

An underslung, U-shaped bracket 128, rigid to the legs of the yoke 114 and engageable by the legs of yokes 110 and 112 therebeneath, has its bight engaging latch 98 therebeneath when yoke 114 is locked thereby in its horizontal position. A spring 130 connects at its lower end with the bight of bracket 128 and connects at its upper end with a tension adjusting bolt 132 depending from extension 126. A spring 134 interconnects the finger 96 and an ear 136 on bracket 128.

The rollers 90 continually support their heads 80 and all parts carried by the latter by virtue of rolling along a track 138 which surrounds the machine 16. Track 138 has an inclined stretch 138a along one side of the machine 16 (FIG. 1) and the arcuate ends of track 138 are essentially horizontal (FIG. 3). At the opposite side of machine 16 (FIG. 2) the track 138 has two inclined stretches 138b and 138c between which is a horizontal stretch 138d. A track 140 on one side only of machine 16 (FIG. 1) engages rollers 90 thereabove.

A short inclined cam rod 142 is provided for rollers 116 on one side of machine 16 (FIG. 2) and on this same side there is provided an inclined stretch 144a of another cam rod 144 for rollers 116. Cam rod 144 continues around one end of machine 16 from stretch 144a into an arcuate, essentially horizontal stretch 144b which terminates at the tube 30 proximal to shaft 36 (FIG. 1).

Framework 28 mounts a release for latch 100 immediately below track stretch 138c (FIG. 2) in the nature of a cam 146 for the roller 108 of latch 100 (FIG. 10) that is adjustably mounted on an inclined plate 148. Track stretch 138c mounts a release for latch 98 adjacent the upper end of stretch 138c (FIG. 2) and taking the form of a cam 150 for the roller 108 of latch 98 (FIG. 11).

A removal tool in the form of an elongated, longitudinally and transversely arcuate spoon 152, mounted on each of the shanks 118 (FIG. 5), has a central notch 154 and a pair of shorter notches 156 at its lowermost free end (FIG. 12). FIGS. 13 and 14 of the drawings illustrate the spoon 152 within the body cavity of the bird 18 between the breastbone 158 and the viscera which include the lungs 160 adjacent backbone 162 and the heart 164 attached to the lungs 160 by veins 166, all forwardly of the heavy bone mass of the hipbones 168.

OPERATION — FIGS. 1–14

The overhead conveyor, which includes the chains 22 and shackles 20, advances the birds 18 in continuous succession along the rods 24 and 26, and the machine 16, in timed relation with the overhead conveyor, advances the carriages 48 around the left hand end of machine 16 (viewing FIG. 2) so that each carriage 48 is aligned with a bird 18 at that side of machine 16 shown in FIG. 2. An access opening for the spoon 152 to the body cavity has previously been cut at the vent of each bird 18.

As the rollers 90 reach the inclined stretch 138a of track 138, the heads 80 descend. At the same time, and while the heads 80 are moving downwardly, the rollers 116 engage the cam rod 142, causing the spoons 152 to swing against the action of springs 134 from the position shown in FIG. 5 toward their plates 50. At about the time rollers 90 reach the stretch 138d of track 138, with the heads 80 at the lowermost ends of their vertical movement relative to plates 50, the lowermost ends of spoons 152 will have reached the access openings adjacent the vents of birds 18. Accordingly, the movement of spoons 152 within the bird cavities along backbones 162 will be arcuate about the axes of shafts 94.

While the heads 80 descend and as the spoons 152 swing downwardly, as above explained, the rollers 72 descend to the horizontal portion 74a of slot 74 in loop 76, lowering racks 60 and rotating pinions 64 to swing arms 70 against the birds 18, holding them between fingers 58 with their backs against plates 50.

As the spoons 152 reach the ends of their swinging movement toward plates 50, the bights of brackets 120 and 128 engage the beveled ends of latches 98 and 100, depressing the same slightly against springs 104 until latches 98 and 100 slip beneath brackets 120 and 128. Then, as rollers 116 pass beyond the lower end of cam rod 142, the yokes 110, 112 and 114 are held against upward swinging movement (see FIG. 7, full lines).

The spoon 152 follows the curvature of breastbone 158 without damage to the internal organs, pressing them toward backbone 162, until spoon 152 comes into engagement with the lungs 160. As soon as roller 90 reaches stretch 138c of track 138, the withdrawal of spoon 152 commences, and at this juncture the full tension of both springs 122 and 130 is exerted on spoon 152 so that it bears tightly against lungs 160 (FIG. 14). This dragging, yet yieldable action across the hard to remove lungs 160 (FIG. 7, dotted lines) loosens them sufficiently for easy withdrawal as upward movement of spoon 152 continues with the viscera captured therein.

When spoon 152 reaches the position shown in FIG. 13, roller 108, engaging cam 146 (FIGS. 2 and 10), will release latch 100, permitting yokes 110 and 112 to swing upwardly about shaft 94, thereby releasing the tension of spring 122 on spoon 152 (FIG. 8). But the latch 98 is still engaging bracket 128 and the tension of spring 130 between yokes 112 and 114 is still on the spoon 152.

During continued upward movement of spoon 152 beyond the position shown in FIG. 13, the pressure of spring 130 on spoon 152 will cause the notch 154 of spoon 152 to clear backbone 162 as spoon 152 withdraws the viscera. The veins 166 will be received in notches 156 and through such veins 166 the lungs 160 will be pulled along by the heart 164.

The spoon 152 and the viscera will have been withdrawn from the body cavity by the time roller 108 reaches cam 150 where latch 98 is released, causing yoke 114 to swing upwardly by the action of spring 134 toward the position shown in FIGS. 4 and 5.

Before roller 90 continues around the machine 16 beyond stretch 138c of track 138, roller 72 will rise in inclined portion 74b of slot 74 to release arm 70, the latter remaining in its outwardly extended position as roller 72 moves along portion 74c of slot 74 (FIG. 1). The eviscerated bird 18 is therefore freed from the carriage 48 for continued advancement by the overhead conveyor before carriage 48 moves to that side of machine 16 shown in FIG. 1.

As roller 116 engages track stretch 144a, the yokes 110, 112 and 114 are held against full upward movement until roller 116 leaves track stretch 144b, whereupon spring 134 swings yokes 110, 112 and 114 into engagement with stop 92 (FIGS. 1, 4 and 5). Roller 90 descends along track 140 and stretch 138a of track 138 with spoon 152 and arm 70 extending outwardly as shown best by FIGS. 1 and 2 in carriage 48c.

DESCRIPTION — FIGS. 15–22

A carriage of modified construction is illustrated in FIGS. 15–18. As in the first embodiment of the carriage described hereinabove, a backup plate 180 serves as a mount for the bird and has a pair of bearing blocks 182 rigid thereto and connected with the conveyor chains 44 in the same manner as in the first embodiment (the connecting links are not shown). The backup plate 180 is provided with a pair of laterally adjustable fingers 184 which are set forwardly from the supporting surface of plate 180 by a spacer block 185, and are bowed outwardly in opposite directions and spaced to receive the body of the bird above its wings and below its legs. The retainer 56 of the first embodiment is not employed.

A T-shaped arm 186 has an offset leg connected at its lower end to a shaft 188 for swinging movement of the arm 186 as the shaft 188 is rotated by a rack and pinion drive of the same type as disclosed hereinabove for the first embodiment of the carriage. Note the roller 190 adjacent the lower end of the rack 192.

A pair of rods 194 are vertically reciprocable in the bearing blocks 182 and carry a head 196 above the plate 180. The head 196 is of somewhat different construction than the head 80 of the previous embodiment, and includes a crossbar 198 rigid to rods 194, a pair of upstanding spaced arms 200 rigid to crossbar 198, and a guide 202 projecting forwardly from crossbar 198. The upper ends of arms 200 are joined by a bar 204 which supports a roller 206. A stop 208 and a shaft 210 also interconnect the arms 200, and a finger 212 projects upwardly from the bar 204.

A latch 214 reciprocates horizontally in crossbar 198 and guide 202. A spring 216 in guide 202 around the latch 214 bears against crossbar 198 and a stop pin 218. The forward end of the latch 214 is beveled and the rearward end thereof carries a roller 220.

The shaft 210 carries an outer yoke 222, an intermediate yoke 224 and an inner yoke 226, all of which are U-shaped and swingable on the shaft 210. The bight of outer yoke 222 has a roller 228 thereon, the bight of intermediate yoke 224 has a shank 230 thereon, and the bight of the inner yoke 226 comprises a tube which is telescoped over and receives shaft 210.

An underslung, U-shaped bracket 232 is rigid to the legs of the outer yoke 222. A spring 234 connects at its lower end with the bight of bracket 232 and connects at its upper end with a tension adjusting bolt 236 depending from an extension 238 on shank 230.

An underslung, U-shaped bracket 240 is rigid with the legs of the inner yoke 226 and has opposed ears 242 in normally underlying engagement with the legs of the intermediate and outer yokes 224 and 222. The bight of bracket 240 is in underlying engagement with the latch 214 when the inner yoke 226 is locked thereby in its horizontal position. A spring 244 connects at its lower end with the bight of bracket 240 and connects at its upper end with a tension adjusting bolt 246 depending from extension 238. A spring 248 also has one end connected with the bight of bracket 240, the opposing end thereof being connected to the finger 212.

A tab 250 projects from the shank 230 at the top of the bight of the intermediate yoke 224 and is normally in overlying engagement with the bight of the outer yoke 222. A pair of L-shaped mounting elements 252 extend upwardly and laterally from the forward ends of the legs of the inner yoke 226 and carry a pair of adjustable bolts presenting stops 254 that are normally spaced above respective legs of the outer yoke 222. A projection 256 is formed on each leg of yoke 222 to reinforce the leg at the surface thereof which is brought into engagement with the corresponding stop 254 upon swinging movement of the yoke 222 illustrated in FIG. 17 by the broken lines.

A removal tool in the form of an elongated, U-shaped loop device 258 is mounted on the shank 230 is essentially the same manner as the spoon 152 of the previous embodiment. The device 258 has a pair of parallel legs 260 and a curved bight presenting the tip 262 of the tool. It should be noted that the tip 262 spans the outer ends 264 of the legs 260, but that the tip 262 extends out of the common plane of the portions of the legs 260 adjacent the ends 264 thereof. This is particularly evident in FIG. 16 where it may be seen that the tip 262 is bent back from the ends 264 so that such ends 264 are in closest proximity to the surface of the plate 180 upon which the bird will be held. Heavy rod stock is suitable for forming the legs 260 and tip 262 as a one-piece loop, reinforced if necessary by braces 265 joined to legs 260.

It should be understood that the modified form of carriage and head illustrated in FIGS. 15–18 may be substituted for the carriage and head of the first embodiment of the invention illustrated in FIGS. 1–12 with only minor modifications to the remaining components of the eviscerating machine. Referring to FIGS. 1–3, the roller 190 on the rack 192 would travel in the cam slot 74, with the rollers 206 and 228 corresponding to the rollers 90 and 116 of the first embodiment. This requires a modified cam and track arrangement for the rollers 206 and 228 illustrated in FIGS. 19–22 and described hereinafter.

The cam and track 266 for the outer roller 228 is illustrated in FIGS. 19 and 20 and includes an inclined cam stretch 268 and a slightly inclined track stretch 270 interconnected by an adjustable linkage 272. FIG. 20 views the cam and track 266 as it would appear on the machine in FIG. 2, the cam stretch 268 substituting for the cam rod 142, and the track stretch 270 substituting for the stretch 144a. As in the first embodiment, the stretch 270 extends around to the backside of the machine before terminating. An additional track 274 is mounted beneath track stretch 270 at the end of the evisceration process.

FIG. 21 shows the track 276 utilized to support the inner roller 206 during the time that the carriage is receiving and holding the bird. The track 276 is seen in FIG. 21 as it would appear on the machine in FIG. 2, and includes a horizontal stretch 276a replacing the track stretch 138d, and an adjustable, inclined stretch 276b, replacing the inclined stretch 138c, followed by a stretch 276c of only slight inclination. The track 276 is horizontal following the stretch 276c and extends around the backside of the machine, ultimately dropping to the horizontal stretch 276a in the same general manner as stretches 138a and 138b of the first embodiment. The illustrations in FIGS. 20 and 21 are vertically aligned to facilitate a direct comparison of the relative positions of the rollers 206 and 226 during the evisceration process.

The framework 28 of the machine is modified to accommodate the adjustable linkage 272 and the adjustable track stretch 276b. Accordingly, the framework 28 is provided with upright tubes, two of which are shown at 278 in FIGS. 19 and 20, which telescopically receive support members 280 rigid with track stretch 270 and extending vertically upwardly therefrom. Setscrews (not shown) or other suitable means are employed to releasably secure the members 280 within the tubes 278 at the elevation desired for track stretch 270. In like manner, a vertical support member 282 has its lower end fixed to track stretch 276c (FIG. 21) and is also adjustable vertically.

The adjustable linkage 272 includes an elongated bar 284 pivoted at its lower end to cam stretch 268, the bar 284 having a longitudinal channel therein receiving a slidable tongue 286 pivotally joined to the track stretch 270. Retainer elements 288 extend across the upper surface of the bar 284 to hold the tongue 286 in the channel. The adjustable track stretch 276b is constructed in the same manner but is inverted with respect to the linkage 272, the arrangement of the parts being clearly shown in FIG. 22 and designated by the same reference numerals as above with the addition of the prime notation. Accordingly, the tongues 286 and 286′ slide in the channeled bars 284 and 284′ as the track stretches 270 and 276c are raised or lowered to the desired height, which will depend upon the size of the birds to be eviscerated.

A release for latch 214 is located at the beginning of track stretch 276c (FIG. 21) and comprises a cam 290 which is engageable by the roller 220 carried by the latch 214. The cam 290 is inwardly arcuate, similar to the cam 150 utilized with the first embodiment and illustrated in FIG. 11.

OPERATION — FIGS. 15–22

At the outset, operation of the machine is analogous to that as previously discussed with respect to the first form of carriage and head. At about the time rollers 206 reach the track stretch 276a, the tips 262 of the removal devices 258 will have reached the access openings adjacent the vents of the birds. Prior to this time and thereafter while the rollers 206 are supported by the track stretch 276a, the cam stretch 268 is forcing the rollers 228 downwardly to thereby cause the devices 258 to swing against the action of springs 248. Since the rollers 190 are following the cam slot 74, the arms 186 are swung against the birds to hold them between the fingers 184 with their backs against the plates 180.

As the device 258 of an individual head 196 reaches the end of its swinging movement toward the plate 180, the bight of bracket 240 engages the latch 214 to depress it slightly against the spring 216 until the latch 214 slips over the bight of the bracket 240. This occurs at the end of the instroke of the device 258 as the roller 228 reaches the bottom end of the cam stretch 268. The inner yoke 226 is now locked in the position shown in FIG. 16. With the yoke 226 locked, clockwise movement of the device 258 about the shaft 210 (as viewed in FIG. 16) is permitted only against the action of spring 244 and then, after a predetermined displacement, against the action of both springs 244 and 234.

The device 258 enters the body cavity of the bird in the same manner as described previously for the spoon 152. However, the ends 264 of the legs 260 engage the back of the bird at the lung region on opposite sides of the backbone, thereby applying pressure in this region which is enhanced by the presence of the block 185, the latter spacing the bird away from the surface of the plate 180 at the lung region. Therefore, the greatest pressure is applied at such region at the beginning of the drawing stoke of the device 258, effected as the roller 206 travels up the inclined track stretch 276b.

It is important to note that the shape of the tip 262 of the device 258 serves to relieve pressure on the backbone although the ends 264 of the legs 260 are maintained in engagement with the back of the bird. Being bent away from the ends 264 and longitudinally curved, the bight presenting the tip 262 does not scrape along the backbone yet is sufficiently close thereto to effect the necessary capture of the gizzard between the legs 260. Therefore, the viscera is pulled from the body cavity in a bundle by the tip 262 as the legs 260 are withdrawn with the viscera trapped therebetween.

By virtue of the curved tip 262, the lungs are not actually removed. Instead, the tissue in the lung region is broken to loosen the lungs and also loosen the esophagus, thereby permitting the esophagus, to be stretched during drawing while it is maintained attached to the crop and mouth.

Furthermore, the curved tip 262 prevents removal of the sex organs as well as the lungs so that both may be inspected while intact. Later in the evisceration process, a vacuum gun may be employed to complete the removal of the lungs and sex organs. Accordingly, use of the device 258 of loop configuration is desirable in the United States, for example, where the lungs and sex organs must be left intact for government inspection.

The spring 244 provides a yieldable support for the device 258 while maintaining pressure thereon to hold the ends 264 in engagement with the back of the bird. However, in the event that the device 258 is deflected to the degree illustrated in FIG. 17 by the broken lines, the legs of the outer yoke 222 at the projections 256 engage the stops 254, thereby effectively locking the outer yoke 222 to the inner yoke 226 so that the intermediate yoke 224 (carrying the removal device 258) now must move against the combined force of both springs 244 and 234. Reverse swinging movement of the device 258 to the broken line position illustrated in FIG. 17 could occur, for example, as the device 258 is entering the body cavity due to striking a bone obstruction encountered as it enters. Therefore, the second spring 234 serves to increase the resistance to further reverse swinging movement to assure that the ends 264 are properly seated in the lung area and minimize the possibility of a complete failure to eviscerate. Normally, the deflection permitted against the action of the first spring 244 only will accommodate movement of the device 258 over bone structure encountered during the drawing stroke.

At the end of the drawing stroke, the roller 220 on latch 214 engages the cam 290 to withdraw the latch 214 as illustrated by the arrow and the broken lines in FIG. 17. This releases all of the yokes 222, 224 and 226 to permit the same to swing upwardly about shaft 210 under the force of spring 248. At this time, the outer roller 228 engages the track stretch 270 to prevent the device 258 from suddenly swinging out and up; instead, the gradual incline of the track stretch 270 holds the yokes 222, 224 and 226 against full upward movement until the roller 228 advances beyond track stretch 270. The slight incline of track stretch 270, however, permits some additional rise in the viscera to clear the bird, but the gradual rise thus provided prevents the esophagus from breaking so that the viscera stays with the bird. The track 274 is provided to prevent significant downward movement of the yokes 222, 224 and 226 in the event that the bird is heavy enough to pull the roller 228 downwardly away from the track thereabove, in order to prevent relatching of the inner yoke 226 which might otherwise occur.

Having thus described the invention, what is claimed as new and desired to be secured by Letters Patent is:

1. In apparatus for removing viscera from the body cavity of a bird through an access opening at the vent thereof, said apparatus including:
   a shiftable unit;
   a removal tool carried by the unit for swinging movement in the cavity toward the back of the bird to a position capturing the viscera in the tool;
   releasable latch means on the unit for holding the tool in said position; and
   structure for shifting the unit in a direction to withdraw the tool and the viscera from the cavity through said opening while the tool is held in said position by the latch means,
   there being a control assembly on said unit having resilient means operably coupled with the tool for yieldably supporting the latter in said position against swinging movement away from the back of the bird,
   said latch means being engageable with said assembly upon said swinging movement of the tool to said position.

2. In apparatus as claimed in claim 1, wherein is further provided means for disengaging said latch means from said assembly to release the tool after full withdrawal thereof.

3. In apparatus for removing viscera from the body cavity of a bird through an access opening at the vent thereof, said apparatus including:
   a shiftable unit;
   a removal tool carried by the unit for swinging movement in the cavity toward the back of the bird to a position capturing the viscera in the tool;
   releasable latch means on the unit for holding the tool in said position; and
   structure for shifting the unit in a direction to withdraw the tool and the viscera from the cavity through said opening while the tool is held in said position by the latch means,
   said tool having an elongated, generally U-shaped configuration, presenting a pair of spaced legs having outer ends bridged by a bight defining the tip of the tool.

4. In apparatus as claimed in claim 3, wherein said tip is configured to relieve pressure on the backbone of the bird when the tool is in said position with said ends of the legs engaging the back of the bird on opposite sides of the backbone.

5. In apparatus as claimed in claim 4 wherein portions of said legs adjacent said ends thereof lie substantially in a common plane, and wherein said tip is curved and extends out of said plane.

6. In apparatus as claimed in claim 3 wherein is provided resilient means for yieldably supporting the tool in said position with said ends of the legs in pressure engagement with the back of the bird on opposite sides of the backbone thereof, and wherein said tip is configured to relieve pressure on the backbone while said pressure engagement of said ends with the back is maintained.

7. In apparatus for removing viscera from the body cavity of a bird through an access opening at the vent thereof, said apparatus including:
   a shiftable unit;
   a removal tool carried by the unit for swinging movement in the cavity toward the back of the bird to a position capturing the viscera in the tool;
   releasable latch means on the unit for holding the tool in said position; and
   structure for shifting the unit in a direction to withdraw the tool and the viscera from the cavity through said opening while the tool is held in said position by the latch means,
   resilient means being provided for yieldably supporting the tool against reverse swinging movement away from the back of the bird,
   said resilient means being responsive to a predetermined degree of said reverse movement for increasing the resistance to further reverse movement of the tool.

8. In apparatus for removing viscera from the body cavity of a bird through an access opening at the vent thereof, said apparatus including:
   a bird mount;
   means for maintaining the back of the bird against the mount;

means for holding the bird against fore to aft movement relative to the mount;

a unit shiftable on the mount;

a removal tool carried by the unit for swinging movement in the cavity toward the back of the bird to a position capturing the viscera in the tool;

releasable latch means on the unit for holding the tool in said position; and structure for shifting the unit in a direction to withdraw the tool and the viscera from the cavity through said opening while the tool is held in said position by the latch means.

9. In apparatus as claimed in claim 8 wherein said mount is movable along a predetermined path of travel and wherein said structure is disposed for engagement with said unit as the latter moves with the mount.

10. In apparatus as claimed in claim 8 wherein said mount is movable along a predetermined path of travel, wherein an actuator is provided to swing the tool to said position, and wherein said tool is provided with means disposed to engage said actuator as the tool moves with the mount.

11. In apparatus as claimed in claim 8 wherein is provided resilient means for yieldably supporting the tool in said position in pressure engagement with the back of the bird, said mount having means for supporting the bird in a disposition to effect application of greatest pressure by the tool during engagement with the back of the bird at the lung region thereof.

12. For use with an overhead conveyor adapted to suspend a bird by its legs, apparatus for removing the viscera from the body cavity of said bird through an access opening at the vent thereof as the bird is advanced by the conveyor, said apparatus including:

a carriage movable with the suspended bird alongside the latter and provided with a mount for the bird;

means for maintaining the back of the bird against the mount;

means for holding the bird against fore to aft movement relative to the mount;

a unit shiftable on the mount;

a removal tool carried by the unit for swinging movement in the cavity toward the back of the bird to a position capturing the viscera in the tool;

releasable latch means on the unit for holding the tool in said position; and structure for shifting the unit in a direction to withdraw the tool and the viscera from the cavity through said opening while the tool is held in said position by the latch means.

13. In apparatus for removing viscera from the body cavity of a bird through an access opening at the vent thereof, said apparatus including:

a shiftable unit;

a spoon carried by the unit for swinging movement in the cavity to a position interposed between the viscera and the breast of the bird;

a pair of control assemblies on said unit;

each assembly having resilient means operably coupled with the spoon for yieldably pressing the spoon against the viscera toward the backbone of the bird, at least one of the assemblies being releasable;

structure for shifting the unit in a direction to withdraw the spoon and the viscera from the cavity through said opening; and means for releasing said one assembly after partial withdrawal of said spoon, said one assembly being swingable on the unit and disposed to swing, when released, in a direction to remove the tension of its resilient means on said spoon.

14. In apparatus for removing viscera from the body cavity of a bird through an access opening at the vent thereof, said apparatus including:

a shiftable unit;

a spoon carried by the unit for swinging movement in the cavity to a position interposed between the viscera and the breast of the bird;

a pair of control assemblies on each unit;

each assembly having resilient means operably coupled with the spoon for yieldably pressing the spoon against the viscera toward the backbone of the bird, at least on of the assemblies being releasable;

structure for shifting the unit in a direction to withdraw the spoon and the viscera from the cavity through said opening; and means for releasing said one assembly after partial withdrawal of said spoon, the other of said assemblies being also releasable, there being means for releasing said other assembly after full withdrawal of said spoon.

15. In apparatus as claimed in claim 14 wherein said assemblies are separately swingable on the unit and each disposed to swing, when released, in a direction to remove the tension of its resilient means on said spoon.

* * * * *